April 27, 1926.
A. BUCHANAN
1,582,246
BEARING FOR DRYING CYLINDERS AND THE LIKE
Filed Nov. 23, 1923 2 Sheets-Sheet 1
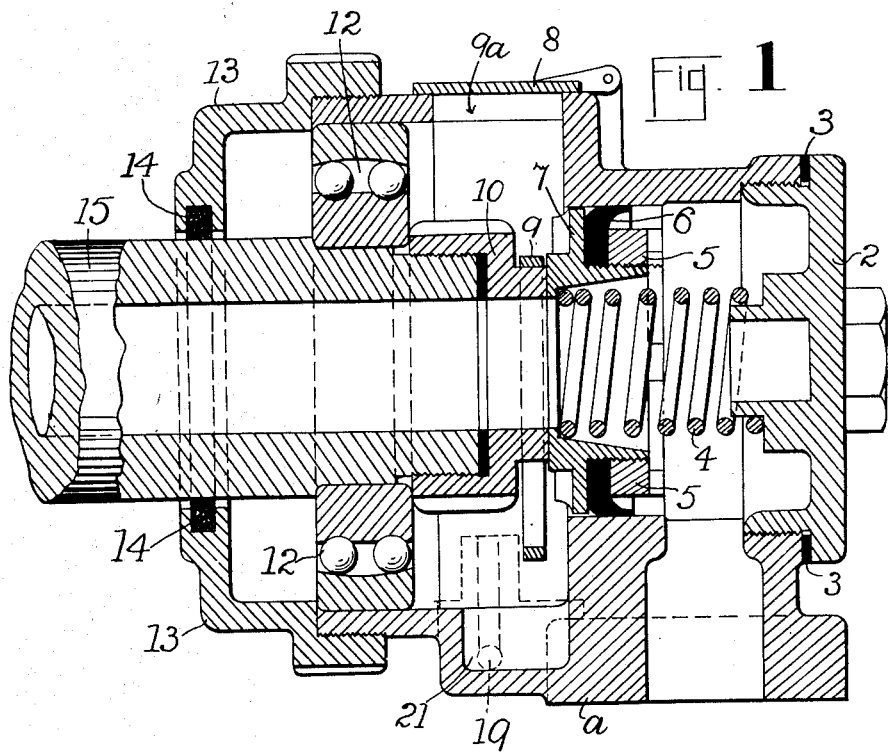
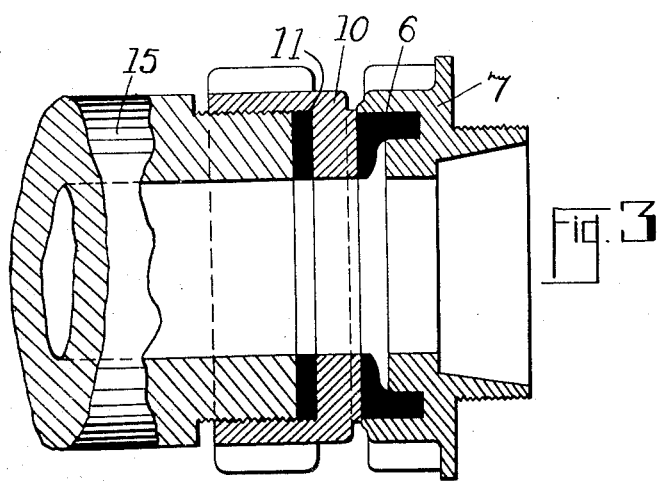
Inventor
Albert Buchanan
by Wright Brown Quinby May
Attys.

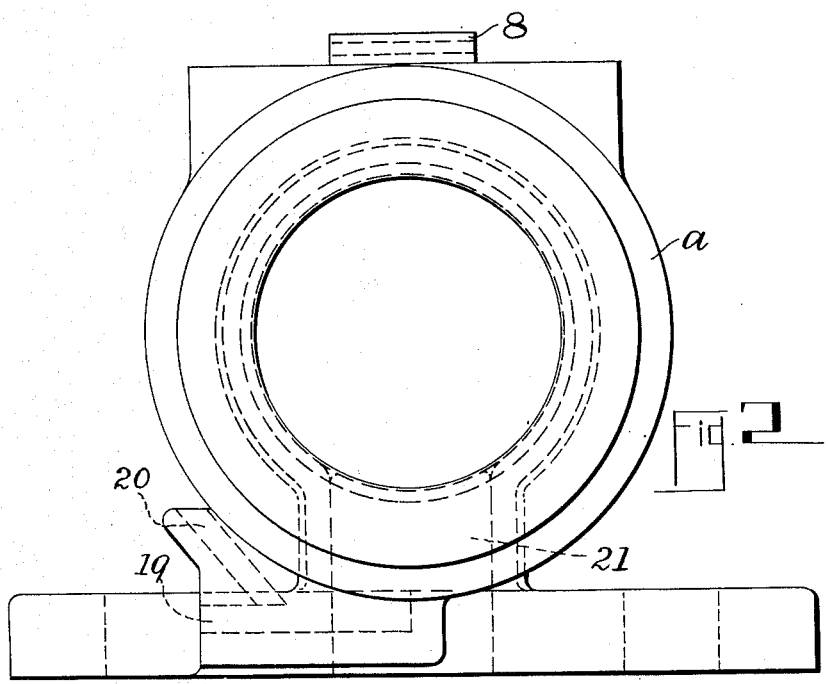
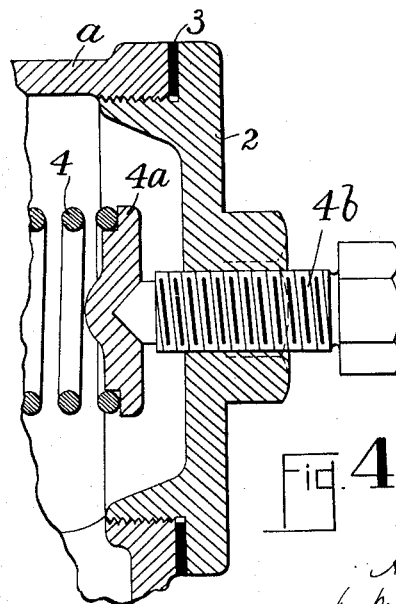

Patented Apr. 27, 1926.

1,582,246

UNITED STATES PATENT OFFICE.

ALBERT BUCHANAN, OF REDDISH VALE, NEAR STOCKPORT, ENGLAND.

BEARING FOR DRYING CYLINDERS AND THE LIKE.

Application filed November 23, 1923. Serial No. 676,540.

*To all whom it may concern:*

Be it known that I, ALBERT BUCHANAN, a British subject, residing at Sunnyside, Reddish Vale, near Stockport, in the county of Chester, England, have invented new and useful Improvements in Bearings for Drying Cylinders and the like.

This invention relates to improvements in doll head bearings as used in drying cylinders and the like of the type wherein a slidable steam-tight contact is made between the trunnion end and a non-rotary member of the bearing, the contact between these two said members being effected by contacting flat surfaces. The object of my invention is the production of such doll head bearing which is simple to construct and which is steam-tight under all normal conditions and which is more readily maintained clean and in working order than is the case with most bearings of this type heretofore employed.

In cylinders of the said type it is well known that when the temperature thereof is raised the cylinder trunnion expands, the expansion laterally or axially being considerably greater than expansion in any other direction, so that to provide a perfect doll head, it is necessary to employ devices which allow automatically this comparatively large lateral expansion and also the expansions of smaller magnitudes in other directions, maintaining a steam-tight contact under all usual conditions.

The doll head bearing according to my invention affords these said desiderata.

To attain my object I make use in the doll head bearing of a nonrotary member carrying a ring of material sufficiently flexible to maintain a steam-tight contact therein the said non-rotary member or block being capable automatically of slight universal movement and also capable of considerable movement laterally, and having a faced part which contacts with the faced end of the cylinder trunnion or of a member mounted between the said trunnion and the block, the contact between them being maintained by a spring.

In order that my said invention may be readily understood, I have hereunto appended sheets of drawings illustrative thereof, to which by figures and letters, reference is made in the following description.

Fig. 1 is a sectional side elevation of my improved doll head bearing.

Fig. 2 is an end elevation of the framework thereof.

Fig. 3 is a sectional side elevation of a modified form of bearing which I may employ.

Fig. 4 is a sectional side elevation of another modification.

Similar figures and letters of reference indicate like parts throughout the several views.

In carrying my invention into effect I make use of a cap 10 of hard metal which is screwed to the trunnion end, a washer 11 of rubber or other suitable material being inserted between the end of the trunnion and the said cap. The end surface of the said cap is preferably machined and makes contact with the corresponding face upon a block 7, so that between the two members 10 and 7 a steam tight contact can be maintained by pressing the seating 7 against the cap 10. The block 7 has mounted upon it a ring 6 of india rubber composition or like material this being held in position by means of a castle nut 5, as shown by Fig. 1. The ring 6 makes contact with the outer wall of the bearing casing *a* in such manner that whilst its flexibility allows its block 7 a slight universal movement, it maintains a steam tight contact with said casing. The block 7 is pressed against the flat surface of the cap 10 by means of the steam pressure within the bearing assisted by the spring 4, one end of which abuts against the cap 2.

Between the detachable cap 2 which screws into the end of the casing, and the casing I preferably insert a ring 3 of asbestos or other suitable material to ensure a steam tight joint. An opening 23 is formed in the base of the casing, and this communicates with the opening within the block 7 and with the hollow interior of the trunnion. In order that the flat surfaces of the cap 10 and block 7 may be maintained constantly lubricated an oil ring 9 is employed. An opening 9ª is provided which has a metal cover 8 to allow of ready admittance to the said contacting surfaces for inspection and other purposes. A large oil well 21 as shown by Fig. 2 is provided, this having a cleaning hole 19 as shown by Figs. 1 and 2, and an overflow 20 for water should any accumulate at this part of the bearing.

To the front of the casing *a* is mounted a cap 13 which is preferably screwed to said casing and has an opening through which the trunnion passes, a packing ring 14 being supplied if desired, as shown by Fig. 1. Fitting within the casing a is a ball race for which a space is afforded so that should the trunnion expand in length, the ball race has ample room for lateral sliding movement.

As the spring 4 may become weaker after considerable use the arrangement shown by Fig. 4 may be employed in which one end of the spring 4 abuts against a member $4^a$ which is held in position by a screw $4^b$ in the end member or cap 2. By advancing the screw $4^b$ the compression of the spring may be increased to the desired extent.

By a slight modification in construtcion I may arrange the bearing to be of non-lubricating type. In this case as shown by Fig. 3 a ring $6^a$ of rubber composition is mounted flush against the machined surface of the cap 10, this being fixed to the trunnion end and having a packing ring 11 to make this joint steam tight. Of course, in this case it is also necessary to use a ring 6 mounted on the member 7 similar to that illustrated in Figure 1 to prevent escape of steam from the bearing.

Such being the nature and object of my said invention, what I claim is:—

1. In a bearing for drying cylinders, a combination comprising a trunnion with a faced end, a bearing casing, a spring pressed universally accommodating non-rotary metal block having a faced part contacting with said trunnion end, and a ring of flexible material mounted on said block and making steam-tight contact with the bearing casing.

2. In a bearing for drying cylinders, a combination comprising a trunnion with a faced end, a bearing casing, a spring pressed universally accommodating non-rotary metal block having a faced part contacting with said trunnion end, a ring of flexible material mounted on said block and making steam-tight contact with the bearing casing, and a slidable ball race mounted on said trunnion.

3. In a bearing for drying cylinders, a combination comprising a trunnion with a faced end, a bearing casing, a spring pressed universally accommodating metal block, a flexible ring mounted on said block and making sliding contact with said trunnion end, and a second ring of flexible material on said block making steam-tight contact with the bearing casing.

4. In a bearing for drying cylinders, a combination comprising a trunnion with a faced end, a bearing casing, a universally accommodating non-rotary metal block having a faced part contacting with said trunnion end, a spring for maintaining contact between the trunnion and said block, means for regulating the compression of said spring, and a flexible ring mounted on said block and making steam-tight contact with the bearing casing.

In testimony whereof I have signed my name to this specification.

ALBERT BUCHANAN.